US011861835B2

United States Patent
Yoo et al.

(10) Patent No.: US 11,861,835 B2
(45) Date of Patent: Jan. 2, 2024

(54) AUTOMATIC HEMORRHAGE EXPANSION DETECTION FROM HEAD CT IMAGES

(71) Applicant: Siemens Healthcare GmbH, Erlangen (DE)

(72) Inventors: Youngjin Yoo, Princeton, NJ (US); Thomas Re, Monroe, NJ (US); Eli Gibson, Plainsboro, NJ (US); Andrei Chekkoury, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 280 days.

(21) Appl. No.: 17/211,927

(22) Filed: Mar. 25, 2021

(65) Prior Publication Data

US 2022/0309667 A1 Sep. 29, 2022

(51) Int. Cl.
*G06T 7/00* (2017.01)
*G06T 7/11* (2017.01)
*G06T 7/30* (2017.01)

(52) U.S. Cl.
CPC .............. *G06T 7/0014* (2013.01); *G06T 7/11* (2017.01); *G06T 7/30* (2017.01); *G06T 2207/10081* (2013.01); *G06T 2207/20081* (2013.01); *G06T 2207/20084* (2013.01); *G06T 2207/20212* (2013.01); *G06T 2207/30016* (2013.01)

(58) Field of Classification Search
CPC . G06T 7/0014; G06T 7/11; G06T 7/30; G06T 2207/10081; G06T 2207/20081; G06T 2207/20084; G06T 2207/20212; G06T 2207/30016
See application file for complete search history.

(56) References Cited

U.S. PATENT DOCUMENTS 11,301,720 B2 * 4/2022 Levanony ................. G06T 7/11
11,410,302 B2 * 8/2022 Huang ..................... A61B 6/469
(Continued)

OTHER PUBLICATIONS

Mostafa Salem, Sergi Valverde, Mariano Cabezas, Deborah Pareto, Arnau Oliver, Joaquim Salvi, Àlex Rovira, Xavier Lladó, A fully convolutional neural network for new T2-w lesion detection in multiple sclerosis, NeuroImage: Clinical, vol. 25, 2020, 102149, ISSN 2213-1582 (IDS document) (Year: 2020).*

(Continued)

*Primary Examiner* — Oneal R Mistry
*Assistant Examiner* — Vaisali Rao Koppolu

(57) ABSTRACT

Systems and methods for assessing expansion of an abnormality are provided. A first input medical image of a patient depicting an abnormality at a first time and a second input medical image of the patient depicting the abnormality at a second time are received. The second input medical image is registered with the first input medical image. The abnormality is segmented from 1) the first input medical image to generate a first segmentation map and 2) the registered second input medical image to generate a second segmentation map. The first segmentation map and the second segmentation map are combined to generate a combined map. Features are extracted from the first input medical image and the registered second input medical image are based on the combined map. Expansion of the abnormality is assessed based on the extracted features using a trained machine learning based network. Results of the assessment are output.

20 Claims, 7 Drawing Sheets

(56) References Cited

U.S. PATENT DOCUMENTS

| | | | |
|---|---|---|---|
| 11,633,146 B2* | 4/2023 | Leng | A61B 5/004 600/423 |
| 2007/0036402 A1* | 2/2007 | Cahill | G06T 7/0012 382/128 |
| 2017/0154422 A1* | 6/2017 | Hogan | G06V 10/435 |
| 2020/0211694 A1* | 7/2020 | Nye | G06T 7/11 |
| 2021/0233645 A1* | 7/2021 | Morard | G06T 7/0014 |

OTHER PUBLICATIONS

Lee et al., "An Explainable Deep-Learning Algorithm for the Detection of Acute Intracranial Haemorrhage from Small Datasets", Nature Biomedical Engineering, 2019, vol. 3, No. 3.

Sepahvand et al., "CNN Detection of New and Enlarging Multiple Sclerosis Lesions from Longitudinal MRI Using Subtraction Images", 2020 IEEE 17th International Symposium on Biomedical Imaging (ISBI), 2020, IEEE.

Salem et al., "A Fully Convolutional Neural Network for New T2-W Lesion Detection in Multiple Sclerosis", NeuroImage: Clinical 25, 2020, pp. 1-12.

Extended European Search Report (EESR) dated Aug. 16, 2022 in corresponding European Patent Application No. 22163977.6.

Andrea Morotti et al: "Standards for Detecting, Interpreting, and Reporting Noncontrast Computed Tomographic Markers of Intracerebral Hemorrhage Expansion", Annals of Neurology, John Wiley and Sons, Boston, US, vol. 86, No. 4, Aug. 24, 2019 (Aug. 24, 2019), pp. 480-492.

* cited by examiner

100

```
Receive 1) a first input medical image of a patient depicting an abnormality at
a first time and 2) a second input medical image of the patient depicting the
abnormality at a second time
102
```

```
Register the second input medical image with the first input medical image
104
```

```
Segment the abnormality from a) the first input medical image to generate a
first segmentation map and b) the registered second input medical image to
generate a second segmentation map
106
```

```
Combine the first segmentation map and the second segmentation map to
generate a combined map
108
```

```
Extract features from the first input medical image and the registered second
input medical image based on the combined map
110
```

```
Assess expansion of the abnormality based on the extracted features using a
trained machine learning based network
112
```

```
Output results of the assessment
114
```

| | AUC | SEN | SPC | Precision | Recall | F1-Score |
|---|---|---|---|---|---|---|
| Segmentation based detection | N/A | 64 | 95 | 74 | 63 | 68 |
| Longitudinal detection network | 87.8 | 77.8 | 91.1 | 65.6 | 77.8 | 71.2 |

Figure 4

AUTOMATIC HEMORRHAGE EXPANSION DETECTION FROM HEAD CT IMAGES

TECHNICAL FIELD

The present invention relates generally to hemorrhage expansion detection, and in particular to automatic hemorrhage expansion detection from head CT (computed tomography) images.

BACKGROUND

Intracerebral hemorrhages are commonly caused by a rupture of a blood vessel within the brain causing localized bleeding in the surrounding tissue. Expansion of the hemorrhage, referred to as hemorrhage expansion, has been identified as an important biomarker indicating high risk of early neurological deterioration and poor long-term clinical outcomes. It is therefore important to accurately detect hemorrhage expansion in patients to effectively stratify the patients and to tailor intensive and timely patient care.

In the current clinical practice, hemorrhage expansion is manually detected by a radiologist qualitatively reading head CT (computed tomography) image pairs of the patient acquired at different timepoints. However, the manual detection of hemorrhage expansion is time-consuming and limited by inter- and intra-rater variability due to the substantial human interaction and judgment involved in reading CT images, thus hindering timely diagnosis.

Recently, automated systems have been proposed for localizing hemorrhages in baseline and follow-up head CT image pairs of a patient. In such automated systems, hemorrhages are segmented from the baseline and follow-up images and the segmented hemorrhages are compared to assess hemorrhage expansion. However, the assessment of hemorrhage expansion by comparing hemorrhage segmentations is not reliable due to imaging artifacts and imperfect segmentation.

BRIEF SUMMARY OF THE INVENTION

In accordance with one or more embodiments, systems and methods for assessing expansion of an abnormality are provided. A first input medical image of a patient depicting an abnormality at a first time and a second input medical image of the patient depicting the abnormality at a second time are received. The second input medical image is registered with the first input medical image. The abnormality is segmented from a) the first input medical image to generate a first segmentation map and b) the registered second input medical image to generate a second segmentation map. The first segmentation map and the second segmentation map are combined to generate a combined map. Features are extracted from the first input medical image and the registered second input medical image are based on the combined map. Expansion of the abnormality is assessed based on the extracted features using a trained machine learning based network. Results of the assessment are output.

In one embodiment, the abnormality comprises a hemorrhage. The first input medical image and the second input medical image may be CT (computed tomography) images of a head of the patient.

In one embodiment, the features are extracted from the first input medical image and the registered second input medical image based on the combined map by generating an input image based on the first input medical image, the registered second input medical image, and the combined map, extracting 2D in-plane features from slices of the generated input image, and extracting out-of-plane features from the extracted 2D in-plane features. The expansion of the abnormality may be assessed by determining an expansion score based on the extracted out-of-plane features. The expansion score may be compared to one or more threshold values. The input image may be generated by generating a 3-channel input image comprising the first input medical image, the registered second input medical image, and the combined map.

In one embodiment, the extracting the 2D in-plane features is performed using a first trained machine learning based feature extraction network and the extracting the out-of-plane features is performed using a second trained machine learning based feature extraction network, and the trained machine learning based network, the first trained machine learning based feature extraction network, and the second trained machine learning based feature extraction network are jointly trained.

In one embodiment, the first segmentation map and the second segmentation map are combined by applying a voxelwise OR operation to the first segmentation map and the second segmentation map to generate the combined map.

These and other advantages of the invention will be apparent to those of ordinary skill in the art by reference to the following detailed description and the accompanying drawings.

BRIEF DESCRIPTION OF THE DRAWINGS

FIG. 1 shows a method for assessing expansion of an abnormality, in accordance with one or more embodiments;

FIG. 4 shows a table comparing a conventional segmentation based detection system and a longitudinal detection network in accordance with embodiments described herein;

DETAILED DESCRIPTION

The present invention generally relates to methods and systems for automatic hemorrhage expansion detection from head CT (computed tomography) images. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Further, reference herein to pixels of an image may refer equally to voxels of an image and vice versa.

Embodiments described herein provide for the automatic assessment of expansion of hemorrhages and other abnormalities. The expansion of hemorrhages is clinically referred to as hemorrhage expansion. Embodiments described herein apply hemorrhage segmentation systems to effectively differentiate pathological changes between a baseline input medical image and a follow-up input medical image. The segmentation results are combined and features are extracted from the baseline input medical image and the follow-up input medical image based on the combined segmentation results. A trained machine learning based classifier network is applied to assess expansion of the hemorrhage based on the extracted features. Advantageously, embodiments described herein provide for the automatic assessment of expansion of hemorrhages with higher accuracy as compared with conventional approaches.

Figure 2:
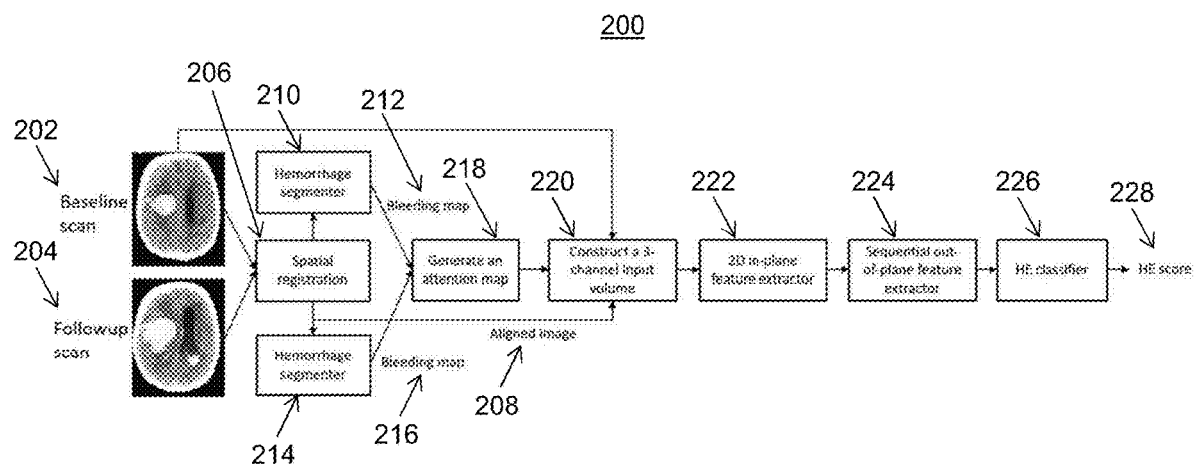
FIG. 2 shows a workflow for assessing expansion of a hemorrhage, in accordance with one or more embodiments.

FIG. 1 shows a method 100 for assessing expansion of an abnormality, in accordance with one or more embodiments. FIG. 2 shows a workflow 200 for assessing expansion of a hemorrhage, in accordance with one or more embodiments. FIG. 1 and FIG. 2 will be described together. The steps of method 100 may be performed by one or more suitable computing devices, such as, e.g., computer 702 of FIG. 7.

At step 102 of FIG. 1, a first input medical image of a patient depicting an abnormality at a first time and a second input medical image of a patient depicting the abnormality at a second time are received. In one embodiment, as in workflow 200 of FIG. 2, the abnormality is a hemorrhage. However, the abnormality may be any other abnormality of the patient, such as, e.g., lesions, nodules, and other abnormalities where tissue deformation and artifact are involved. The first input medical image may be a baseline input medical image of the abnormality and the second input medical image may be a follow-up input medical image of the abnormality. For example, as shown in workflow 200 of FIG. 2, the first input medical image may be baseline scan 202 of the head of the patient and the second input medical image may be follow-up scan 205 of the head of the patient.

In one embodiment, the first input medical image and/or the second input medical image are CT images. However, the first input medical image and/or the second input medical image may comprise any other suitable modality, such as, e.g., MRI (magnetic resonance imaging), ultrasound, x-ray, or any other medical imaging modality or combinations of medical imaging modalities. The first input medical image and/or the second input medical image may be 2D (two dimensional) images and/or 3D (three dimensional) volumes, and may comprise a single input medical image or a plurality of input medical images. In one embodiment, the first input medical image and/or the second input medical image comprise 2.5D (2D plus time) images. The first input medical image and/or the second input medical image may be received directly from an image acquisition device, such as, e.g., a CT scanner, as the medical images are acquired, or can be received by loading previously acquired medical images from a storage or memory of a computer system or receiving medical images that have been transmitted from a remote computer system.

At step 104 of FIG. 1, the second input medical image is registered with the first input medical image. The registration spatially aligns the first input medical image and the second input medical image. In one example, baseline scan 202 and follow-up scan 204 in workflow 200 of FIG. 2 are spatially registered at block 206 to generate an aligned image 208 of follow-up scan 204. The second input medical image may be registered with the first input medical image using any suitable approach, such as, e.g., known rigid registration or linear registration techniques.

At step 106 of FIG. 1, the abnormality is segmented from a) the first input medical image to generate a first segmentation map and b) the registered second input medical image to generate a second segmentation map. In one example, in workflow 200 of FIG. 2, hemorrhages are segmented from baseline scan 202 to generate bleeding map 212 and hemorrhages are segmented from aligned image 208 of follow-up scan 204 to generate bleeding map 216. Bleeding map 212 and bleeding map 216 in workflow 200 may be binary segmentation maps where, for example, a voxel (or pixel) intensity value of 1 indicates that the abnormality is present at that voxel and a voxel intensity value of 0 indicates that the abnormality is not present at that voxel.

In one embodiment, the segmentation is performed using a trained machine learning based segmentation network. The trained machine learning based segmentation network may be implemented using a U-Net, a Dense U-NET, or any other suitable machine learning based architecture. The trained machine learning based segmentation network is trained to segment the abnormality from medical images during a prior offline or training stage using ground truth annotated maps. Once trained, the trained machine learning based segmentation network is applied during an online or testing stage (e.g., at step 106 of FIG. 1).

At step 108 of FIG. 1, the first segmentation map and the second segmentation map are combined to generate a combined map. For example, bleeding map 212 and bleeding map 216 in workflow 200 of FIG. 2 are combined to generate an attention map 218. In one embodiment, the first segmentation map and the second segmentation map are combined by applying a voxelwise (or pixelwise) OR operation to the first segmentation map and the second segmentation map such that, for example, a voxel value of 1 at corresponding voxels in either the first segmentation map or the second segmentation map results in a voxel value of 1 at that voxel in the combined map, and a voxel value of 0 otherwise. Other approaches for combining the first segmentation map and the second segmentation map are also contemplated.

At step 110 of FIG. 1, features are extracted from the first input medical image and the registered second input medical image based on the combined map. The features may be extracted from the first input medical image and the registered second input medical image based on the combined map using any suitable approach. The combined map identifies specific regions where the abnormality is located in either the first segmentation map or the second segmentation map, thereby enabling features to be extracted from the first input medical image and the registered second input medical image with a focus on the specific regions identified by the combined map.

In one embodiment, the features are extracted by first generating an input image based on the first input medical image, the registered second input medical image, and the combined map. The input image may be a 3-channel input image comprises the first input medical image, the registered second input medical image, and the combined map. For example, in workflow 200 of FIG. 2, a 3-channel input volume is constructed at block 220.

2D in-plane features are then extracted from the 3-channel input image. For example, in workflow 200 of FIG. 2, 2D in-plane features are extracted from the 3-channel input volume by 2D in-plane feature extractor 222. The 2D in-plane features comprise latent features extracted from each 2D slice of the 3-channel input image. The 3-channel input image is used as an attention map to focus the extraction of 2D in-plane features to regions identified in the combined map. The 2D in-plane features may be extracted using any suitable 2D machine learning based segmentation network, such as, e.g., a pre-trained 2D segmentation network or a Res-Net32/Res-Net50 network pretrained with public datasets (e.g., ImageNet).

Sequential out-of-plane features are then extracted from the 2D in-plane features. For example, in workflow 200 of FIG. 2, sequential out-of-plane features are extracted from the 2D in-plane features by sequential out-of-plane feature extractor 224. The sequential out-of-plane features model the 3D context of the 3-channel input image. The sequential out-of-plane features may be extracted using any suitable sequential out-of-plane feature extractor trained to learn the relationship between the 2D in-plane features and the sequential out-of-plane features. The sequential out-of-plane feature extractor may be implemented using RNNs (recurrent neural networks) with LSTM (long short-term memory), BGRUs (bidirectional gated recurrent units), or any other suitable machine learning based network.

At step 112 of FIG. 1, expansion of the abnormality is assessed based on the extracted features using a trained machine learning based network. The trained machine learning based network may be any suitable trained machine learning based classifier network. The trained machine learning based classifier network receives as input the extracted sequential out-of-plane features and generates an expansion score. For example, in workflow 200 of FIG. 2, expansion of the hemorrhage is assessed by HE (hemorrhage expansion) classifier 226 based on the sequential out-of-plane features to determine an HE score 228. The trained machine learning based classifier network first estimates a global latent feature vector from the extracted sequential out-of-plane features by max-pooling, global average pooling, or any other suitable pooling method. The expansion score is then predicted based on the global latent feature vector by fully-connected layers or fully-convolutional blocks. The expansion score represents the likelihood of expansion of the abnormality between the first input medical image and the second input medical image. The expansion score may be compared with one or more threshold values to provide final results (e.g., expansion/no expansion or expansion/no expansion/uncertain).

The trained machine learning based classifier network is trained during a prior offline or training stage using annotated pairs of training images. The pairs of training images may be annotated as being an expansion where the pairs of training images depict, for example, at least a 33% increase in volume of the abnormality. Any other threshold increase in volume of the abnormality may be selected for annotating the training images as depicting an expansion. Once trained, the trained machine learning based classifier network is applied during an online or testing stage (e.g., at step 112 of FIG. 1).

At step 114 of FIG. 1, results of the assessment are output. For example, the results of the assessment can be output by displaying the results of the assessment on a display device of a computer system, storing the results of the assessment on a memory or storage of a computer system, or by transmitting the results of the assessment to a remote computer system.

Advantageously, embodiments described herein model longitudinal image features in medical images acquired at different timepoints to thereby improve performance. Since the machine learning based networks for extracting 2D in-plane features and sequential out-of-plane features can be trained with 2D images slices to model 3D longitudinal radiological features, fewer 3D training images are required as compared to conventional systems, thus reducing the cost of data acquisition. Further, embodiments described herein may exploit existing pretrained machine learning based networks, resulting in faster training convergence and overfitting reduction while reducing development costs.

In one embodiment, at least some of the machine learning based networks utilized in method 100 may be jointly trained. For example, a first trained machine learning based feature extraction network may be utilized for 2D in-plane feature extraction (at step 110), a second trained machine learning based feature extraction network may be utilized for sequential out-of-plane feature extraction (at step 110), and the first trained machine learning based feature extraction network, the second trained machine learning based feature extraction network, and the trained machine learning based network (utilized at step 112) may be jointly trained using an optimizer such as, e.g., Adam.

Figure 3:
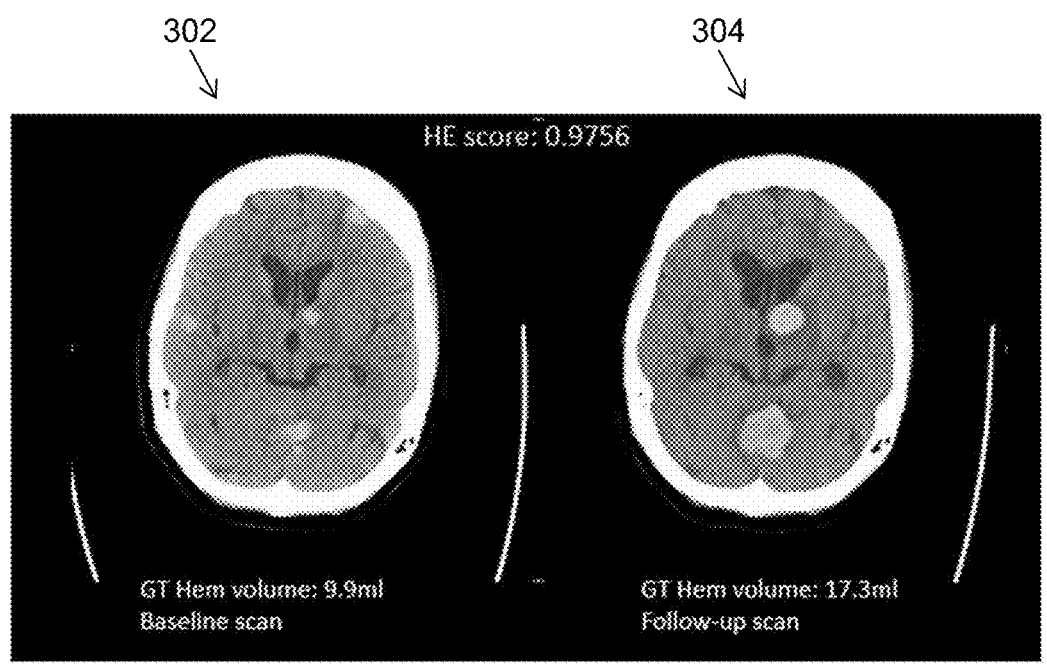
FIG. 3 shows results of an assessment of expansion of a hemorrhage determined in accordance with one or more embodiments.

FIG. 3 shows results of an assessment of expansion of a hemorrhage determined in accordance with one or more embodiments. First input medical image 302 shows a baseline scan of a head of a patient depicting hemorrhages at a first time and second input medical image 204 shows a follow-up scan of the head of the patient depicting hemorrhages at a second time. As shown in FIG. 3, first input medical image 302 was manually assessed to have a GT (ground truth) hemorrhage volume of 9.9 ml (milliliters) while second input medical image 304 was manually assessed to have a GT hemorrhage volume of 17.3 ml. First input medical image 302 and second input medical image 304 were assessed in accordance with embodiments described herein to have an HE score of 0.9756.

FIG. 4 shows a table 400 comparing a conventional segmentation based detection system and a longitudinal detection network in accordance with embodiments described herein. Table 400 compared the AUC (area under curve), SEN (sensitivity), SPC (specificity), precision, recall, and F1-score.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 5:
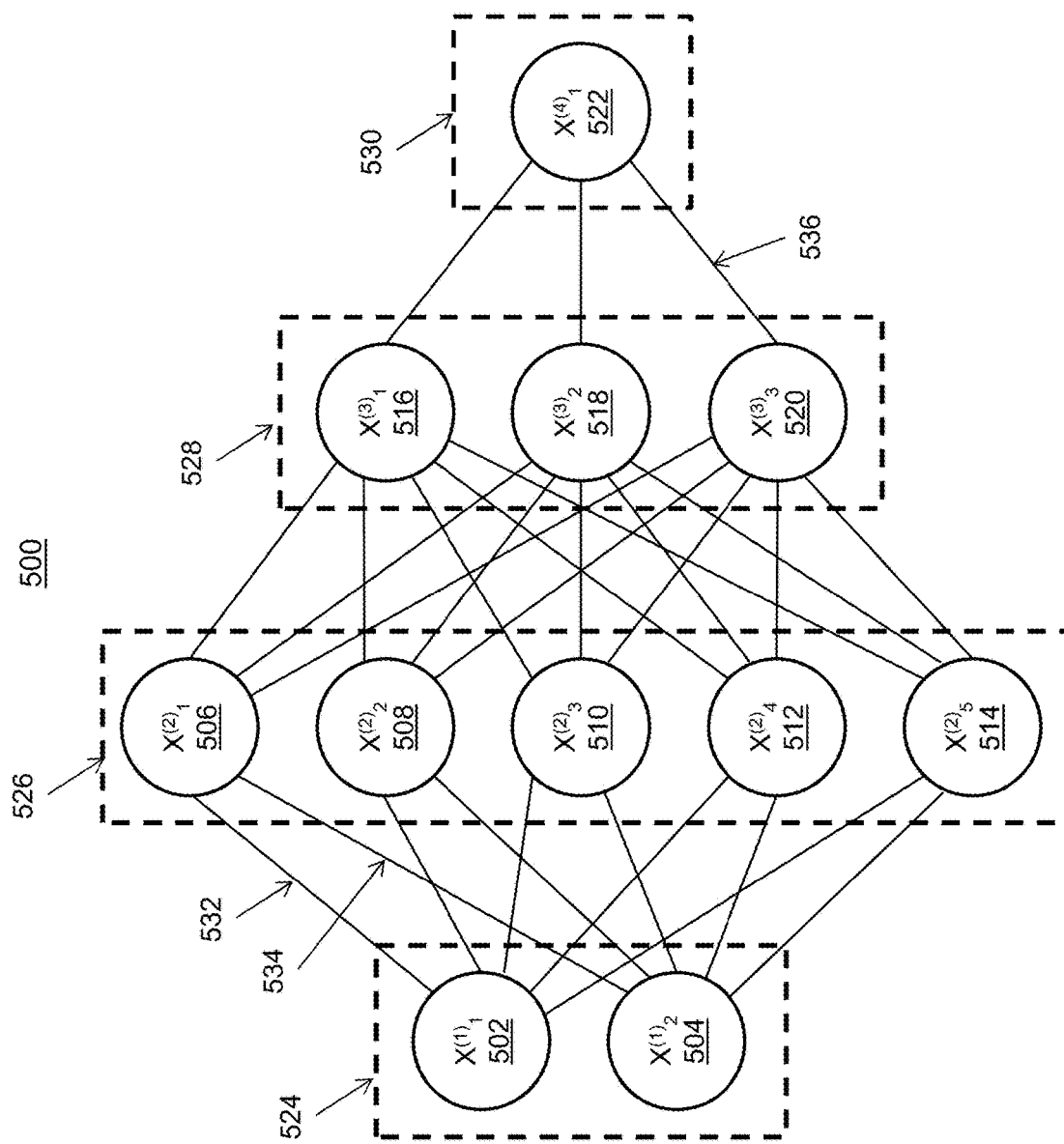
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the machine learning based networks utilized in method 100 of FIG. 1 and workflow 200 of FIG. 2, may be implemented using artificial neural network 500.

The artificial neural network 500 comprises nodes 502-522 and edges 532, 534, ..., 536, wherein each edge 532, 534, ..., 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, ..., 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, ..., 536 between the nodes 502-522. In particular, edges 532, 534, ..., 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x^{(n)}_i$ denotes the value of the i-th node 502-522 of the n-th layer 524-530. The values of the nodes 502-522 of the input layer 524 are equivalent to the input values of the neural network 500, the value of the node 522 of the output layer 530 is equivalent to the output value of the neural network 500. Furthermore, each edge 532, 534, ..., 536 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 502-522 of the m-th layer 524-530 and the j-th node 502-522 of the n-th layer 524-530. Furthermore, the abbreviation $w^{(n)}_{i,j}$ is defined for the weight $w^{(n,n+1)}_{i,j}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w^{(m,n)}_{i,j}$ for the edges, the neural network 500 has to be trained using training data. In particular, training data comprises training input data and training output data (denoted as $t_i$). For a training step, the neural network 500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 500 (backpropagation algorithm). In particular, the weights are changed according to $$w'^{(n)}_{i,j} = w^{(n)}_{i,j} - \gamma \cdot \delta_j^{(n)} \cdot x_i^{(n)}$$

wherein $\gamma$ is a learning rate, and the numbers $\delta^{(n)}_j$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta^{(n+1)}_j$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 530, wherein f' is the first derivative of the activation function, and $y^{(n+1)}_j$ is the comparison training value for the j-th node of the output layer 530.

Figure 6:
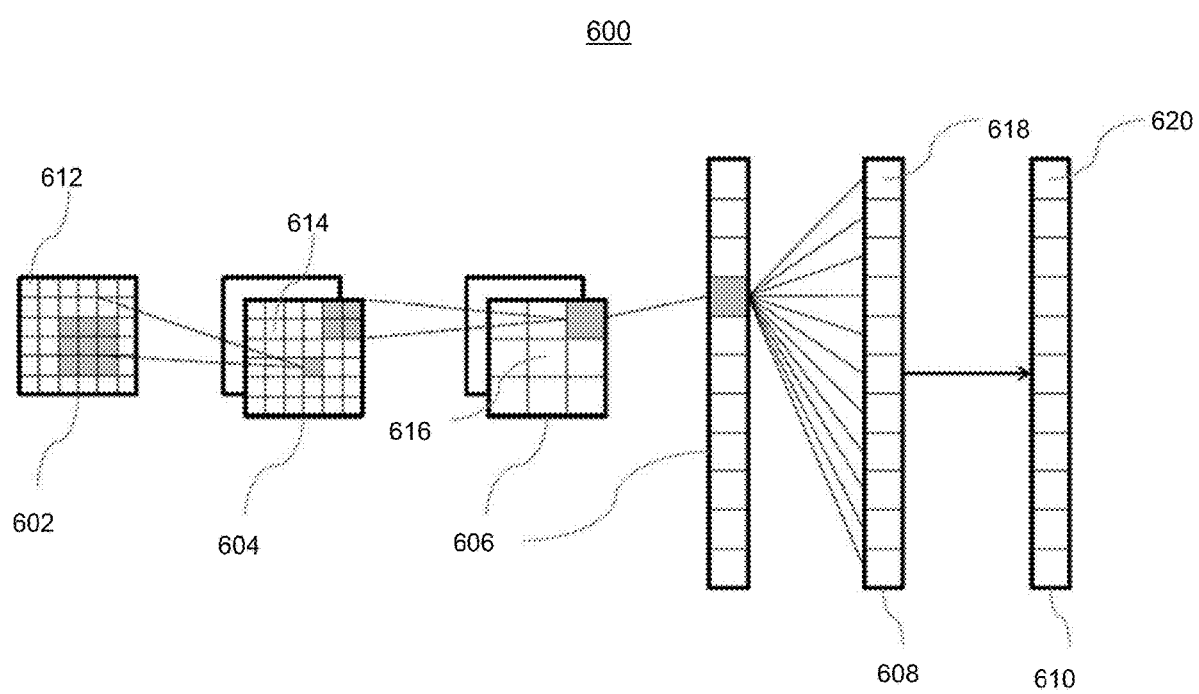
FIG. 6 shows a convolutional neural network that may be used to implement one or more embodiments.

FIG. 6 shows a convolutional neural network 600, in accordance with one or more embodiments. Machine learning networks described herein, such as, e.g., the machine learning based networks utilized in method 100 of FIG. 1 and workflow 200 of FIG. 2, may be implemented using convolutional neural network 600.

In the embodiment shown in FIG. 6, the convolutional neural network comprises 600 an input layer 602, a convolutional layer 604, a pooling layer 606, a fully connected layer 608, and an output layer 610. Alternatively, the convolutional neural network 600 can comprise several convolutional layers 604, several pooling layers 606, and several fully connected layers 608, as well as other types of layers. The order of the layers can be chosen arbitrarily, usually fully connected layers 608 are used as the last layers before the output layer 610.

In particular, within a convolutional neural network 600, the nodes 612-620 of one layer 602-610 can be considered to be arranged as a d-dimensional matrix or as a d-dimensional image. In particular, in the two-dimensional case the value of the node 612-620 indexed with i and j in the n-th layer 602-610 can be denoted as $x^{(n)}_{[i,j]}$. However, the arrangement of the nodes 612-620 of one layer 602-610 does not have an effect on the calculations executed within the convolutional neural network 600 as such, since these are given solely by the structure and the weights of the edges.

In particular, a convolutional layer 604 is characterized by the structure and the weights of the incoming edges forming a convolution operation based on a certain number of kernels. In particular, the structure and the weights of the incoming edges are chosen such that the values $x^{(n)}_k$ of the nodes 614 of the convolutional layer 604 are calculated as a convolution $x^{(n)}_k = K_k * x^{(n-1)}$ based on the values $x^{(n-1)}$ of the nodes 612 of the preceding layer 602, where the convolution * is defined in the two-dimensional case as $$x_k^{(n)}[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 612-618 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 612-620 in the respective layer 602-610. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as expanding along the depth dimension, so that the nodes 614 of the convolutional layer 604 are arranged also as a (d+1)-dimensional matrix, wherein the size of the (d+1)-dimensional matrix with respect to the depth dimension is by a factor of the number of kernels larger than in the preceding layer 602.

The advantage of using convolutional layers 604 is that spatially local correlation of the input data can exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranges as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x^{(n-1)}$ of the nodes 614 of the preceding layer 604 as $$x^{(n)}[i,j] = f(x^{(n-1)}[id_1, jd_2], \ldots, x^{(n-1)}[id_1 + d_1 - 1, jd_2 + d_2 - 1])$$

In other words, by using a pooling layer 606, the number of nodes 614, 616 can be reduced, by replacing a number d1·d2 of neighboring nodes 614 in the preceding layer 604 with a single node 616 being calculated as a function of the values of said number of neighboring nodes in the pooling layer. In particular, the pooling function f can be the max-function, the average or the L2-Norm. In particular, for a pooling layer 606 the weights of the incoming edges are fixed and are not modified by training.

The advantage of using a pooling layer 606 is that the number of nodes 614, 616 and the number of parameters is reduced. This leads to the amount of computation in the network being reduced and to a control of overfitting.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 608 can be characterized by the fact that a majority, in particular, all edges between nodes 616 of the previous layer 606 and the nodes 618 of the fully-connected layer 608 are present, and wherein the weight of each of the edges can be adjusted individually.

In this embodiment, the nodes 616 of the preceding layer 606 of the fully-connected layer 608 are displayed both as two-dimensional matrices, and additionally as non-related nodes (indicated as a line of nodes, wherein the number of nodes was reduced for a better presentability). In this embodiment, the number of nodes 618 in the fully connected layer 608 is equal to the number of nodes 616 in the preceding layer 606. Alternatively, the number of nodes 616, 618 can differ.

Furthermore, in this embodiment, the values of the nodes 620 of the output layer 610 are determined by applying the Softmax function onto the values of the nodes 618 of the preceding layer 608. By applying the Softmax function, the sum the values of all nodes 620 of the output layer 610 is 1, and all values of all nodes 620 of the output layer are real numbers between 0 and 1.

A convolutional neural network 600 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 600 can be trained based on the backpropagation algorithm. For preventing overfitting, methods of regularization can be used, e.g. dropout of nodes 612-620, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps of FIG. 1 or 2, may be performed by a client computer in a network-based cloud computing system. The steps or functions of the methods and workflows described herein, including one or more of the steps of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
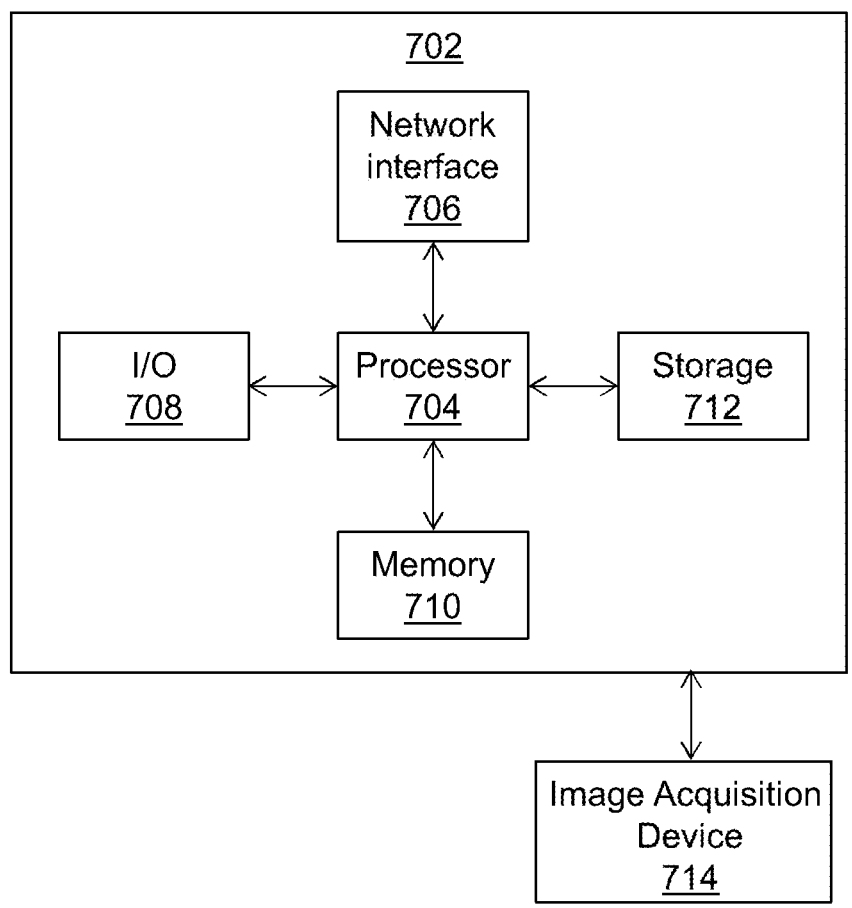
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIG. 1 or 2 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 704 executes the method and workflow steps or functions of FIG. 1 or 2. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving 1) a first input medical image of a patient depicting an abnormality at a first time and 2) a second input medical image of the patient depicting the abnormality at a second time;
registering the second input medical image with the first input medical image;
segmenting the abnormality from a) the first input medical image to generate a first segmentation map and b) the registered second input medical image to generate a second segmentation map;
combining the first segmentation map and the second segmentation map to generate a combined map;
extracting features from the first input medical image and the registered second input medical image based on regions in which the abnormality is located, wherein the regions are identified by the combined map;
assessing expansion of the abnormality based on the extracted features using a trained machine learning based network; and
outputting results of the assessment.

2. The computer-implemented method of claim 1, wherein the abnormality comprises a hemorrhage.

3. The computer-implemented method of claim 1, wherein extracting features from the first input medical image and the registered second input medical image based on regions in which the abnormality is located comprises:
generating an input image based on the first input medical image, the registered second input medical image, and the combined map;
extracting 2D in-plane features from slices of the generated input image; and
extracting out-of-plane features from the extracted 2D in-plane features.

4. The computer-implemented method of claim 3, wherein assessing expansion of the abnormality based on the extracted features using a trained machine learning based network comprises:
determining an expansion score based on the extracted out-of-plane features.

5. The computer-implemented method of claim 4, wherein assessing expansion of the abnormality based on the extracted features using a trained machine learning based network further comprises:
comparing the expansion score to one or more threshold values.

6. The computer-implemented method of claim 3, wherein generating an input image based on the first input medical image, the registered second input medical image, and the combined map comprises:
generating a 3-channel input image comprising the first input medical image, the registered second input medical image, and the combined map.

7. The computer-implemented method of claim 3, wherein the extracting the 2D in-plane features is performed using a first trained machine learning based feature extraction network and the extracting the out-of-plane features is performed using a second trained machine learning based feature extraction network, and the trained machine learning based network, the first trained machine learning based feature extraction network, and the second trained machine learning based feature extraction network are jointly trained.

8. The computer-implemented method of claim 1, wherein combining the first segmentation map and the second segmentation map to generate a combined map comprises:
applying a voxelwise OR operation to the first segmentation map and the second segmentation map to generate the combined map.

9. The computer-implemented method of claim 1, wherein the first input medical image and the second input medical image are CT (computed tomography) images of a head of the patient.

10. An apparatus comprising:
means for receiving 1) a first input medical image of a patient depicting an abnormality at a first time and 2) a second input medical image of the patient depicting the abnormality at a second time;
means for registering the second input medical image with the first input medical image;
means for segmenting the abnormality from a) the first input medical image to generate a first segmentation map and b) the registered second input medical image to generate a second segmentation map;
means for combining the first segmentation map and the second segmentation map to generate a combined map;
means for extracting features from the first input medical image and the registered second input medical image based on regions in which the abnormality is located, wherein the regions are identified by the combined map;

means for assessing expansion of the abnormality based on the extracted features using a trained machine learning based network; and means for outputting results of the assessment.

11. The apparatus of claim 10, wherein the abnormality comprises a hemorrhage.

12. The apparatus of claim 10, wherein the means for extracting features from the first input medical image and the registered second input medical image based on regions in which the abnormality is located comprises:

means for generating an input image based on the first input medical image, the registered second input medical image, and the combined map;

means for extracting 2D in-plane features from slices of the generated input image; and means for extracting out-of-plane features from the extracted 2D in-plane features.

13. The apparatus of claim 12, wherein the means for assessing expansion of the abnormality based on the extracted features using a trained machine learning based network comprises:

means for determining an expansion score based on the extracted out-of-plane features.

14. The apparatus of claim 13, wherein the means for assessing expansion of the abnormality based on the extracted features using a trained machine learning based network further comprises:

means for comparing the expansion score to one or more threshold values.

15. A non-transitory computer readable medium storing computer program instructions, the computer program instructions when executed by a processor cause the processor to perform operations comprising:

receiving 1) a first input medical image of a patient depicting an abnormality at a first time and 2) a second input medical image of the patient depicting the abnormality at a second time;

registering the second input medical image with the first input medical image;

segmenting the abnormality from a) the first input medical image to generate a first segmentation map and b) the registered second input medical image to generate a second segmentation map;

combining the first segmentation map and the second segmentation map to generate a combined map;

extracting features from the first input medical image and the registered second input medical image based on regions in which the abnormality is located, wherein the regions are identified by the combined map;

assessing expansion of the abnormality based on the extracted features using a trained machine learning based network; and outputting results of the assessment.

16. The non-transitory computer readable medium of claim 15, wherein extracting features from the first input medical image and the registered second input medical image based on regions in which the abnormality is located comprises:

generating an input image based on the first input medical image, the registered second input medical image, and the combined map;

extracting 2D in-plane features from slices of the generated input image; and extracting out-of-plane features from the extracted 2D in-plane features.

17. The non-transitory computer readable medium of claim 16, wherein generating an input image based on the first input medical image, the registered second input medical image, and the combined map comprises:

generating a 3-channel input image comprising the first input medical image, the registered second input medical image, and the combined map.

18. The non-transitory computer readable medium of claim 16, wherein the extracting the 2D in-plane features is performed using a first trained machine learning based feature extraction network and the extracting the out-of-plane features is performed using a second trained machine learning based feature extraction network, and the trained machine learning based network, the first trained machine learning based feature extraction network, and the second trained machine learning based feature extraction network are jointly trained.

19. The non-transitory computer readable medium of claim 15, wherein combining the first segmentation map and the second segmentation map to generate a combined map comprises:

applying a voxelwise OR operation to the first segmentation map and the second segmentation map to generate the combined map.

20. The non-transitory computer readable medium of claim 15, wherein the first input medical image and the second input medical image are CT (computed tomography) images of a head of the patient.

* * * * *